Figures 2, 3, 4:
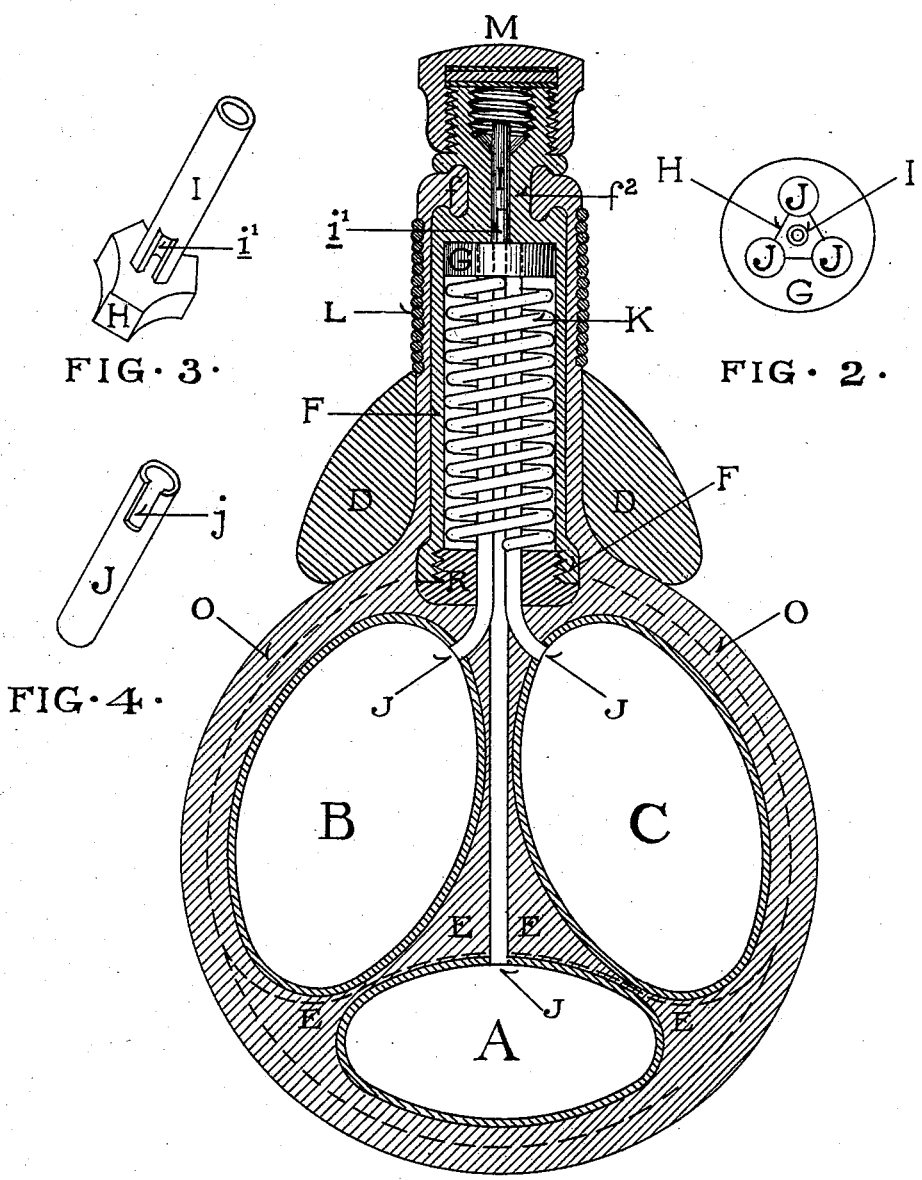

(No Model.)

H. A. MEARS.
VALVE FOR PNEUMATIC TIRES.

No. 601,211. Patented Mar. 22, 1898.

FIGURE · 1 ·

WITNESSES:

INVENTOR
Henry Augustus Mears
BY
ATTORNEYS.

UNITED STATES PATENT OFFICE.

HENRY AUGUSTUS MEARS, OF CAMBRIDGE, MASSACHUSETTS.

VALVE FOR PNEUMATIC TIRES.

SPECIFICATION forming part of Letters Patent No. 601,211, dated March 22, 1898.

Application filed April 24, 1897. Serial No. 633,744. (No model.)

*To all whom it may concern:*

Be it known that I, HENRY AUGUSTUS MEARS, a citizen of the United States, residing at Cambridge, in the county of Middlesex and State of Massachusetts, have invented certain new and useful Improvements in Pneumatic Tires; and I do hereby declare the following to be a full, clear, and exact description of the invention, such as will enable others skilled in the art to which it appertains to make and use the same.

My invention relates to improvements in valves, and particularly to improvements in that class thereof adapted for use in pneumatic tires.

The object of my invention is to provide a simple, inexpensive, compact, and durable valve which will not get out of order and which will always operate.

In accomplishing the object of my invention I make use of a valve which is in the shape of a piston or plunger and is formed in its side with an opening which is normally out of connection with the air-tubes which it is designed to supply with air, but which is adapted to be placed in communication with the said air-tubes when the valve is depressed against the action of a spring that supports it. The neck or guideway for the piston is solid and affords a closure for the opening formed in the side of the piston. When the piston is depressed, air enters through the top of the same and is thence forced into the air tube or tubes of the tire through the aforesaid opening in the side of the valve. A cap covers the end of the valve-casing, which is removed when inflation of the tire is to take place.

My invention is fully illustrated in the drawings which accompany and form a part of this specification, in which the same reference-letters refer to the same or corresponding parts, and in which—

Figure 1 is a vertical section of my tire and also of the valve. Fig. 2 is a top plan view of the valve and of the plate which normally surrounds its base. Fig. 3 is a detail perspective view of the valve. Fig. 4 is a detail perspective view of the end of an air-tube.

Referring to the drawings, O represents the outer tire. Its construction is similar to that of other tires except that it is formed with a strip of fabric, (indicated by dotted lines,) which tends to prevent the tire from being punctured. Within the tire are located the air-chambers A, B, and C. These air-chambers are formed of thin rubber and are provided with separate and distinct air-tubes, which lead upward to the valve-chamber. The air-chambers are surrounded by partitions E, which are formed of solid rubber and may, if desired, have a fabric embedded therein to render them stronger. The partitions E serve to hold the air-chambers in the proper relation to each other and also serve as a protection to the chambers from puncturing. They are preferably formed integral with the tire proper, so that the tire proper and the partitions are a solid mass of rubber, into the holes formed in which the air-chambers A, B, and C are inserted. In some constructions I dispense entirely with the separate air-chambers A, B, and C, which are tubes of thin rubber inserted into openings formed in the tire and pump air directly into the openings themselves.

The air-chamber A is located at the bottom of the tire at the point where a puncture is most likely to occur. It is egg-shaped in cross-section, as shown, and is placed with its long side along the bottom of the tire. The air-tube J leads from its upper surface. The air-chambers B and C are placed in the same relative position to the air-chamber A and are of the same size, so that they balance each other and tend to keep the tire in proper form. The three air-chambers are entirely separate from each other, as also are the air-tubes leading therefrom.

The air-tubes extend upward within the chamber formed in the lower portion of the valve and are of such length that they extend into openings formed therefor in the circular plate G, being held in position in said plate by the base H of the valve I. The base H of the valve is shaped so that it fits the air-tubes tightly and holds them in position, but not so tightly as to prevent vertical reciprocation of the valve when the valve is depressed to allow the slits $i'$, formed in the sides of the same, to communicate with the slits $j$, formed in the upper ends of the air-tubes J, and thus to supply air to such air-tubes.

The valve-casing consists of a casting F, which is held within the rubber necking of the tire which surrounds the valve by the entrance of the ends of the necking into the annular recess $f$, formed therein near the upper end thereof, and by the wire L, which is wrapped around the necking. At its bottom the casting F is screw-threaded to allow the attachment thereto of the screw R, which forms the base of the valve-chamber, and is provided with an opening, through which pass upward the three air-tubes. At its top the casting is screw-threaded to permit the attachment thereto of the interiorly-screw-threaded head or cover M. The head M forms the cover for the valve and may, if desired, be coated with nickel, so as to present a neat and attractive appearance. Interiorly the casting F is formed with a chamber at its lower end, through which pass the air-tubes J and in which is located the spring K, which bears against the screw R and exerts an upward pressure upon the plate G and the base H of the valve I. Near its upper end the casting F is formed with a solid neck $f^2$, which is pierced with an aperture to receive the valve I, and at its top it is interiorly hollowed and screw-threaded to permit the attachment thereto of the tube through which air is to be supplied. The end of the valve I projects upward into the opening thus formed and is adapted to be depressed by the act of screwing in the air-supply tube.

The operation of my valve is as follows: When the tire is to be inflated, the cap M is unscrewed, and the end of the air-supply tube is screwed into the end of the opening formed therefor at the top of the casting F, thereby depressing the valve I and causing the slits $i'$ formed therein to come into communication with the slits $j$, formed in the top of the air-tubes J. Air may now be supplied to the separate air-chambers, and the tire thereby inflated. When a sufficient quantity of air has been forced into the air-chambers, the end of the air-supply tube may be unscrewed and the cover M placed on the valve. The valve I will be automatically forced upward by the action of the spring K, so that communication between the slits or openings in the valve and air-tubes will be effectually cut off. Leakage from the air-chambers is thus prevented entirely independent of the cap or cover M, which, however, furnishes an additional security against leakage.

The wooden rim of the bicycle is represented in the drawings at D. It will be noticed that the tire is quite thick at this point, so that no injurious results ensue from the slight chafing which is apt to take place.

Having thus fully described my invention, what I claim as new, and desire to secure by Letters Patent, is—

1. In a pneumatic tire, the combination with a tire-body, a plurality of independent air-chambers within the same, a valve-casing having a chambered lower portion and a solid neck pierced with an opening, separate air-tubes connected to each of said air-chambers and extending into the chambered portion of said valve-casing, a valve provided with air-supply openings, said valve being arranged to reciprocate within the opening in said neck, a spring normally pressing said valve upward in said neck, thereby closing said air-supply openings, and means for connecting said valve to said tire-body, substantially as described.

2. In a pneumatic tire, the combination with a tire-body, a plurality of independent air-chambers within the same, a valve-casing having a chambered lower end and a solid neck pierced with an opening, and separate air-tubes extending from each of said air-chambers into said chambered valve-casing, of the disk G within said chamber, the valve I formed with openings $i$ and having a base H, the ends of said air-tubes being held within said disk G as described, a spring pressing said valve normally upward, and a connection between said valve-casing and said tire-body, substantially as described.

3. In a pneumatic tire, the combination with a tire-body O, independent air-chambers A, B and C within the same, partitions E surrounding said air-chambers, a valve-casing F having a chambered lower end and a solid neck $f^2$ pierced with an opening, and separate air-tubes extending from each of said air-chambers into said chambered valve-casing, of the disk G within said chamber, the valve I formed with openings $i$ and having a base H, the ends of said air-tubes being held within said disk G as described, a spring pressing said valve normally upward, means for connecting said casing and said tire-body, and the cover M, substantially as described.

In testimony whereof I affix my signature in presence of two witnesses.

HENRY AUGUSTUS MEARS.

Witnesses:
NETTIE I. SAWYER,
FRANK E. MALLETTE.